(12) United States Patent
Basra et al.

(10) Patent No.: US 11,206,511 B2
(45) Date of Patent: *Dec. 21, 2021

(54) MULTICAST INTERFERENCE MITIGATION IN A MOBILE NETWORK

(71) Applicant: Verizon Patent and Licensing Inc., Basking Ridge, NJ (US)

(72) Inventors: Arvind Basra, Glen Ridge, NJ (US); Glenna S. Colaprete, Henrietta, NY (US); Mansoor Ali Shah Mohammed, Plano, TX (US); Said Hanbaly, Prosper, TX (US); Amir Saghir, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/946,686

(22) Filed: Jul. 1, 2020

(65) Prior Publication Data

US 2020/0336863 A1     Oct. 22, 2020

Related U.S. Application Data

(63) Continuation of application No. 16/039,026, filed on Jul. 18, 2018, now Pat. No. 10,721,598.

(51) Int. Cl.
| | |
|---|---|
| *H04W 4/06* | (2009.01) |
| *H04L 12/801* | (2013.01) |
| *H04L 12/18* | (2006.01) |
| *H04W 72/04* | (2009.01) |

(52) U.S. Cl.
CPC ............. *H04W 4/06* (2013.01); *H04L 12/189* (2013.01); *H04L 47/15* (2013.01); *H04W 72/0406* (2013.01)

(58) Field of Classification Search
None
See application file for complete search history.

(56) References Cited

U.S. PATENT DOCUMENTS

2011/0170496 A1* 7/2011 Fong .................. H04W 52/244
 370/329
2011/0243056 A1* 10/2011 Jen ....................... H04L 5/0051
 370/312

(Continued)

*Primary Examiner* — Mohammad S Adhami

(57) ABSTRACT

A first cell device obtains, from a second cell device, multicast information associated with the second cell device, where a first wireless coverage area associated with the first cell device at least partially overlaps a second wireless coverage area associated with the second cell device. The first cell device transmits the multicast information to an element management system, and receives, from the element management system, an instruction, generated based at least on the multicast information, to not use one or more subframes, associated with a multicast transmission session associated with the second cell device, to transmit during the multicast transmission session. The first cell device determines, after receiving the instruction, that the multicast transmission session has been initiated, and causes the first cell device to not use the one or more subframes to transmit during the multicast transmission session associated with the second cell device.

20 Claims, 11 Drawing Sheets

(56) References Cited

U.S. PATENT DOCUMENTS

| | | | |
|---|---|---|---|
| 2015/0146594 A1* | 5/2015 | Grayson | H04W 52/0206 370/311 |
| 2016/0261394 A1* | 9/2016 | Kazmi | H04L 5/0058 |
| 2017/0094669 A1* | 3/2017 | Chandwani | H04W 72/005 |
| 2017/0237534 A1* | 8/2017 | Seki | H04W 72/005 370/312 |
| 2019/0260554 A1* | 8/2019 | Yoon | H04W 72/0453 |

* cited by examiner

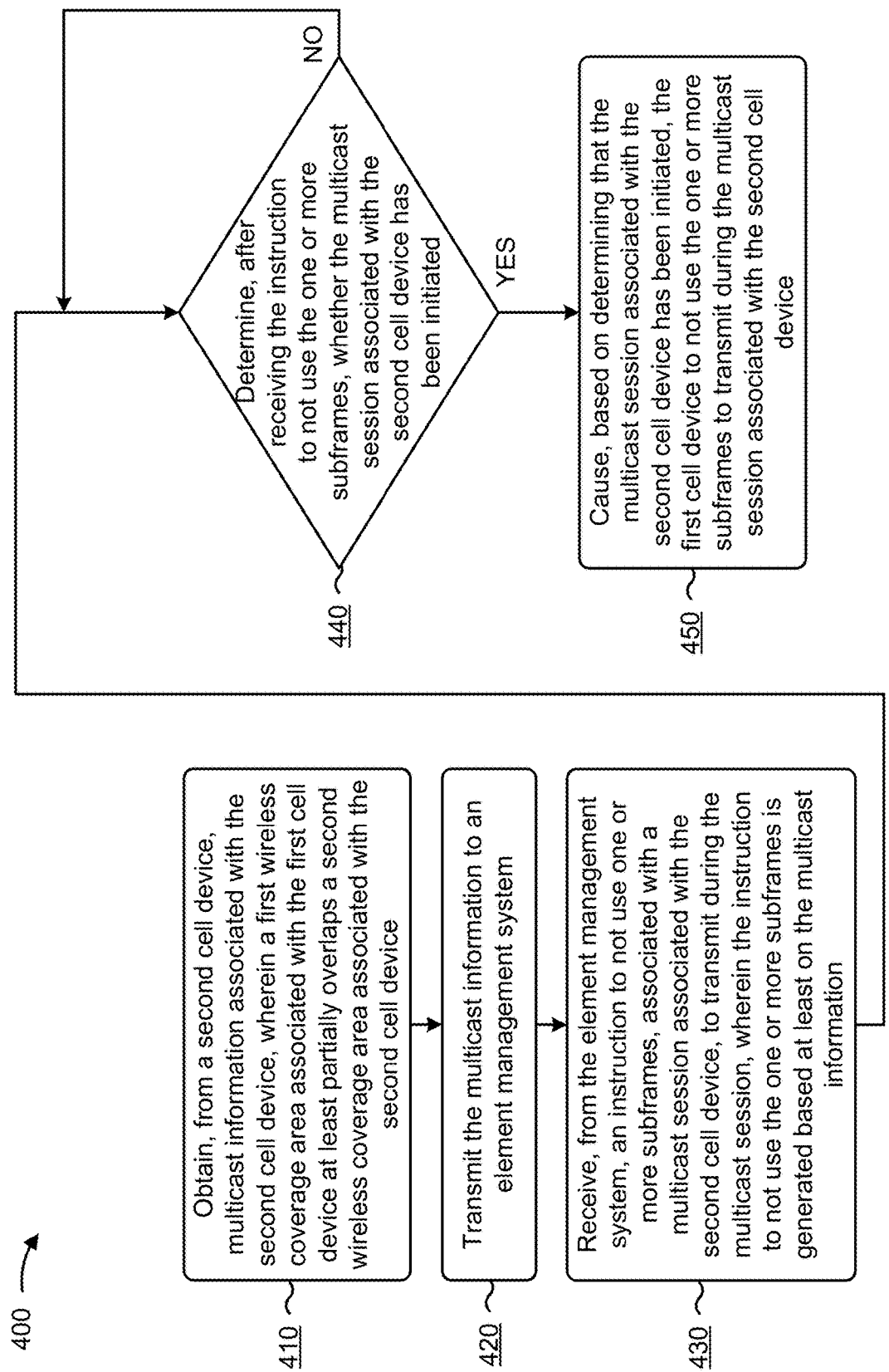

MULTICAST INTERFERENCE MITIGATION IN A MOBILE NETWORK

RELATED APPLICATION

This application is a continuation of U.S. patent application Ser. No. 16/039,026, filed Jul. 18, 2018 (now U.S. Pat. No. 10,721,598), which is incorporated herein by reference.

BACKGROUND

A multicast transmission mode can enable a cell in a mobile network to transmit the same content (e.g., a video stream, a software update, etc.) simultaneously to a plurality of mobile devices. As the quantity of connected devices and demand for over-the-top media services continues to increase, multicast transmission can provide an efficient, cost-effective, and low latency method to serve a large quantity of connected devices with high-quality network services.

BRIEF DESCRIPTION OF THE DRAWINGS

FIG. 4 is a flow chart of an example process for multicast interference mitigation in a mobile network.

DETAILED DESCRIPTION OF PREFERRED EMBODIMENTS

Figure 1A:
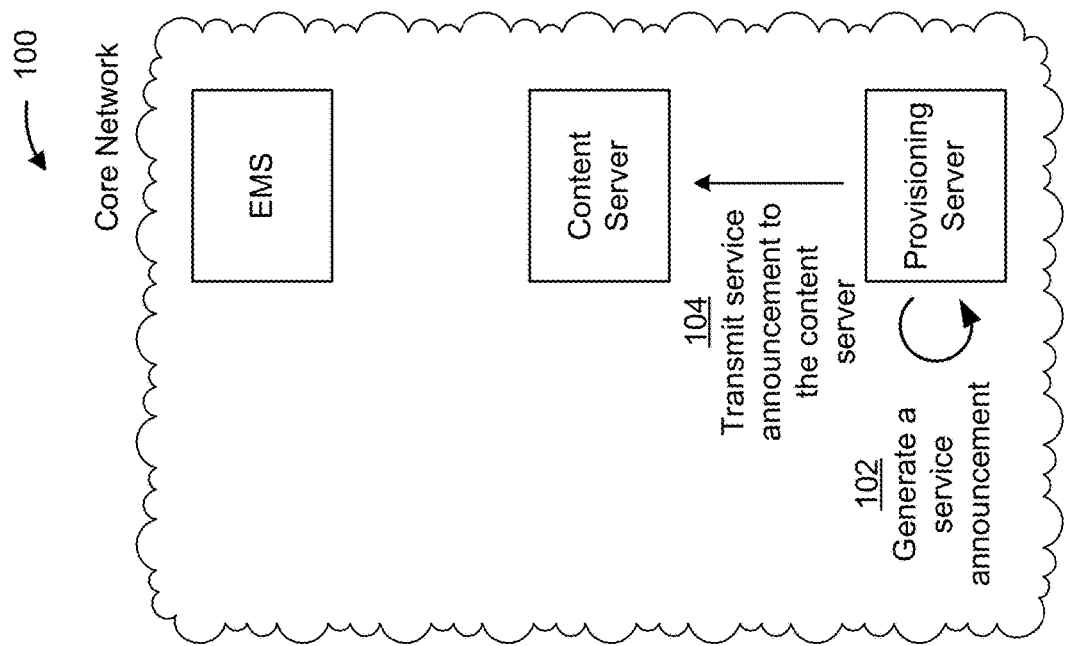
FIGS. 1A-1H are diagrams of an example implementation described herein.
Figure 1A:
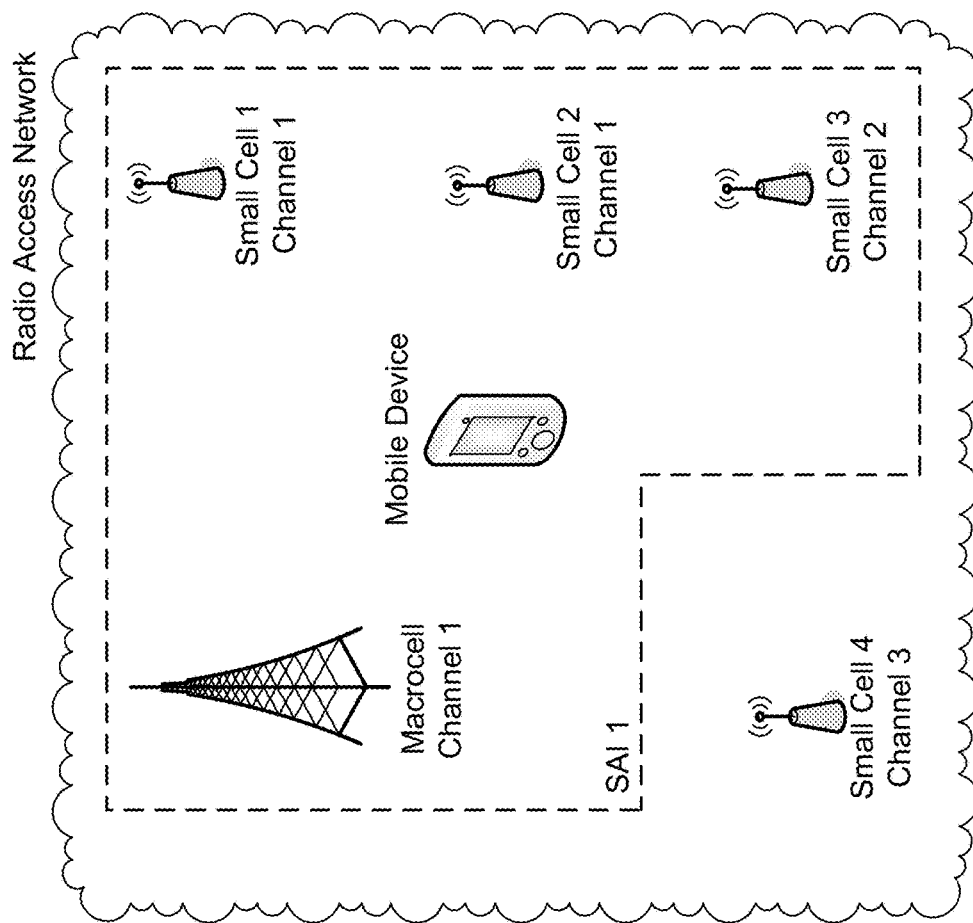

The following detailed description of example implementations refers to the accompanying drawings. The same reference numbers in different drawings can identify the same or similar elements.

In some mobile networks, small cells (e.g., femtocells, picocells, microcells, and/or the like) can be used to increase capacity, fill network coverage gaps, and/or the like. For example, a small cell can be included in a network to increase coverage in an office building, in a home, in a shopping center, and/or the like. In some situations, the small cell can operate independently of a macrocell (e.g., an evolved NodeB (eNodeB), a next generation NodeB (gNodeB), and/or the like) included in the network. For example, the small cell can operate without regard to a multicast transmission session associated with the macrocell. As a result, the small cell can transmit, during the multicast transmission session, on the same frequency that the macrocell is using for the multicast transmission session, which can cause interference with the multicast transmission session. This interference can cause a degradation in performance associated with the multicast transmission session, which in turn can cause a video stream transmitted during the multicast transmission session to freeze, pixelate, and/or time out, can cause one or more multicast packets associated with the multicast transmission session to drop, and/or the like.

Some implementations described herein provide a first cell device capable of obtaining, from a second cell device, multicast information associated with the second cell device. A first wireless coverage area associated with the first cell device can at least partially overlap a second wireless coverage area associated with the second cell device. The first cell device can transmit the multicast information to an element management system, and can receive, from the element management system, an instruction to not use one or more subframes, associated with a multicast transmission session associated with the second cell device, to transmit during the multicast transmission session. The instruction to not use the one or more subframes can be generated based at least on the multicast information. After receiving the instruction to not use the one or more subframes, the first cell device can determine that the multicast transmission session associated with the second cell device has been initiated, and can cause the first cell device to not use the one or more subframes to transmit during the multicast transmission session associated with the second cell device based on determining that the multicast transmission session associated with the second cell device has been initiated.

In this way, the first cell device can decrease interference with multicast transmission sessions in the network, which increases multicast performance in the network. Moreover, in this way, the first cell device conserves network resources that would otherwise be used to retransmit dropped multicast packets caused by interference with multicast transmission sessions in the network.

FIGS. 1A-1H is are diagrams of an example implementation 100 described herein. As shown in FIGS. 1A-1H, implementation 100 can include a mobile device, a radio access network, a core network, and/or the like. In some implementations, the mobile device, the radio access network, and the core network can be included in a mobile network, such as a third generation (3G) mobile network, a fourth generation (4G) mobile network, a fifth generation (5G) mobile network, and/or the like.

In some implementations, the radio access network can include a plurality of base stations, such as one or more small cells (e.g., small cell 1, small cell 2, small cell 3, small cell 4, etc.) (collectively referred to as "small cells" and individually as "small cell"), one or more macrocells, and/or one or more other types of cells. While the example illustrated in FIGS. 1A-1H shows the mobile network including small cell 1, small cell 2, small cell 3, small cell 4, and a macrocell, the mobile network can include a greater or fewer quantity of small cells, a greater quantity of macrocells, a greater quantity of mobile devices, and/or the like.

The small cells and the macrocell can each provide a coverage area in the radio access network. The mobile device can communicatively connect with the mobile network via the small cells and/or the macrocell when the mobile device is in the coverage area provided by the small cells and/or the macrocell. In some implementations, the coverage area provided by the small cells and the coverage area provided by the macrocell may not overlap (e.g., no portion of the coverage area provided by small cell 4 overlaps any portion of the coverage area provided by the macrocell), can at least partially overlap (e.g., one or more portions of the coverage area provided by small cell 3 overlap one or more portions of the coverage area provided by the macrocell), can fully overlap (e.g., the entire coverage area provided by small cell 1 overlaps with the coverage area provided by the macrocell), and/or the like.

In some implementations, the small cells and the macrocell can communicate with the mobile device and/or other devices in the radio access network using a particular frequency channel. The frequency channel can be identified by an evolved universal terrestrial radio access (E-UTRA) absolute radio frequency channel number (EARFCN), and/or another type of identifier. In some implementations, the small cells and/or the macrocell can communicate with the mobile device and/or the other devices in the radio access network using the same or different frequency channels. For example, and as shown in FIGS. 1A-1H, small cell 1, small cell 2, and the macrocell can communicate with the mobile device using the same frequency channel (e.g., Channel 1), small cell 3 can communicate with the mobile device using a different frequency than small cell 1, small cell 2, small cell 4, and the macrocell (e.g., Channel 2), small cell 4 can communicate with the mobile device using a different frequency than small cell 1, small cell 2, small cell 3, and the macrocell (e.g., Channel 3), and/or the like.

In some implementations, the small cells and/or the macrocell can communicate with the mobile device and/or other devices in the radio access network in a unicast (e.g., point-to-point) transmission session, in a multicast or broadcast (e.g., point-to-multipoint) transmission session, and/or the like. As used herein, a session can refer to a connection between a base station included in the mobile network (e.g., a small cell, the macrocell, etc.) and the mobile device (and/or other devices) included in the mobile network on which traffic (e.g., data packets; content such as video, audio, etc.; signaling packets; and/or the like) is transmitted and/or received.

In some implementations, the macrocell can be included in a multicast-broadcast single-frequency network (MBSFN) along with one or more other macrocells. The MBSFN can be associated with a service area identifier (SAI) (e.g., SAI 1), which identifies a particular geographic area served by the coverage areas provided by the macrocell and the one or more other macrocells included in the MBSFN. In the MBSFN, the macrocell and the one or more other macrocells can be adjacent cells that use the same frequency channel (e.g., Channel 1, which can be identified by the same EARFCN) to transmit content in a multicast transmission session. In this way, the mobile network can use the MBSFN to offer a multimedia broadcast-multicast service (MBMS, evolved MBMS (eMBMS), etc.) for mobile television, live video streaming, radio broadcasting, software update delivery, and/or the like in the mobile network.

In some implementations, the core network can include an element management system device (EMS), a content server device, a provisioning server device, and/or the like. The EMS can include one or more server devices that manage one or more devices included in the mobile network. For example, the EMS can manage the small cells, the macrocell, and/or the like. As an example the EMS can store information associated with the small cells, the macrocell, and/or the like (e.g., information identifying a cell identifier associated a small cell, information identifying a frequency channel associated with a small cell, information identifying an SAI associated with the coverage area of the macrocell, information identifying whether a small cell is geographically located in the coverage area of the macrocell (e.g., the coverage area of the small cell at least partially overlaps the coverage area of the macrocell), and/or the like). As another example, the EMS can receive information provided by a small cell, the macrocell, the content server, the provisioning server, and/or the like, and can provide one or more instructions to one or more small cells, the macrocell, and/or other base stations in the radio access network based on the provided information.

The content server can include one or more server devices, data centers, and/or the like that store and deliver content (e.g., video files, audio files, software files, electronic documents, web pages, live video streams, live audio streams, etc.) for delivery to the mobile device and/or other devices included in the mobile network. In some implementations, the content server can include a content delivery network that includes a plurality of server devices, data centers, and/or the like geographically dispersed to decrease delivery times, increase availability of the content stored thereon, and/or the like.

The provisioning server can include one or more server devices that can generate and transmit a service announcement associated with a multicast transmission session in the mobile network. The service announcement can be an electronic file (e.g., an extensible markup language (XML) file, a JavaScript Object Notation (JSON) file, and/or the like) that can include information identifying the content (e.g., content stored on the content server device) to be transmitted in the multicast transmission session (e.g., a type of the content, a name of the content, etc.), information identifying a schedule associated with the multicast transmission session (e.g., an initiation time and/or a termination time for the multicast transmission session), information identifying a frequency channel associated with the multicast transmission session (e.g., a frequency channel that the macrocell and/or the one or more other macrocells included in the MBSFN are to use to transmit the content in the multicast transmission session), information identifying a SAI associated with the multicast transmission session (e.g., a SAI in which the multicast transmission session is to be provided), and/or the like. In some implementations, the provisioning server can include a broadcast video provisioning system (BVPS) (e.g., a system associated with multicasting and/or broadcasting mobile television in the mobile network) and/or another type of provisioning system.

Turning to FIG. 1A, and as shown by reference number 102, the provisioning server can generate a service announcement associated with a multicast transmission session. The multicast transmission session can be a session in which content, such as streaming video, streaming audio, a software update, and/or the like, is transmitted by the macrocell to the mobile device and/or other devices included in the mobile network. The service announcement can include information associated with the multicast transmission session, as described above. For example, the service announcement can include information identifying the content to be transmitted in the multicast transmission session (e.g., a name of a video stream, a location of a software update file, etc.), information identifying a schedule associated with the multicast transmission session, information identifying a frequency channel associated with the multicast transmission session (e.g., Channel 1), information identifying a SAI associated with the multicast transmission session (e.g., SAI 1), and/or the like.

In some implementations, the provisioning server can automatically generate the service announcement based on an occurrence of an event. For example, the provisioning server can automatically generate the service announcement based on the content being stored on the content server, based on receiving a notification that the content is available on the content server, and/or the like. In some implementations, the provisioning server can generate the service announcement based on receiving a request from the content server to generate the service announcement. In some implementations, the provisioning server can generate the service announcement based on receiving an instruction (e.g., from a user) to generate the service announcement.

As shown by reference number 104, the provisioning server can transmit the service announcement to the content server. In some implementations, the provisioning server can also transmit the service announcement to a broadcast multicast service center device (BMSC), which can provide the service announcement to the base stations included in the same SAI identified in the service announcement and that use the same frequency channel identified in the service announcement via a multimedia broadcast multicast services gateway (MBMS-GW).

In some implementations, the provisioning server can automatically transmit the service announcement to the content server. For example, the provisioning server can automatically transmit the service announcement to the content server based on the provisioning server generating the service announcement, based on the provisioning server updating information included in the service announcement (e.g., updating the schedule information to reflect a schedule change for the multicast transmission session and/or the like), and/or the like. In some implementations, the provisioning server can transmit the service announcement to the content server based on receiving a request from the content server for the service announcement. In some implementations, the provisioning server can transmit the service announcement to the content server based on receiving an instruction (e.g., from a user) to transmit the service announcement to the content server.

The content server can receive the service announcement from the provisioning server and can store the service announcement on the content server, on another server included in the mobile network, and/or the like. In some implementations, the content server can store the service announcement in a data store, such as a database, a storage device (e.g., a hard drive, a memory device, etc.), a file system, and/or the like.

Figure 1B:
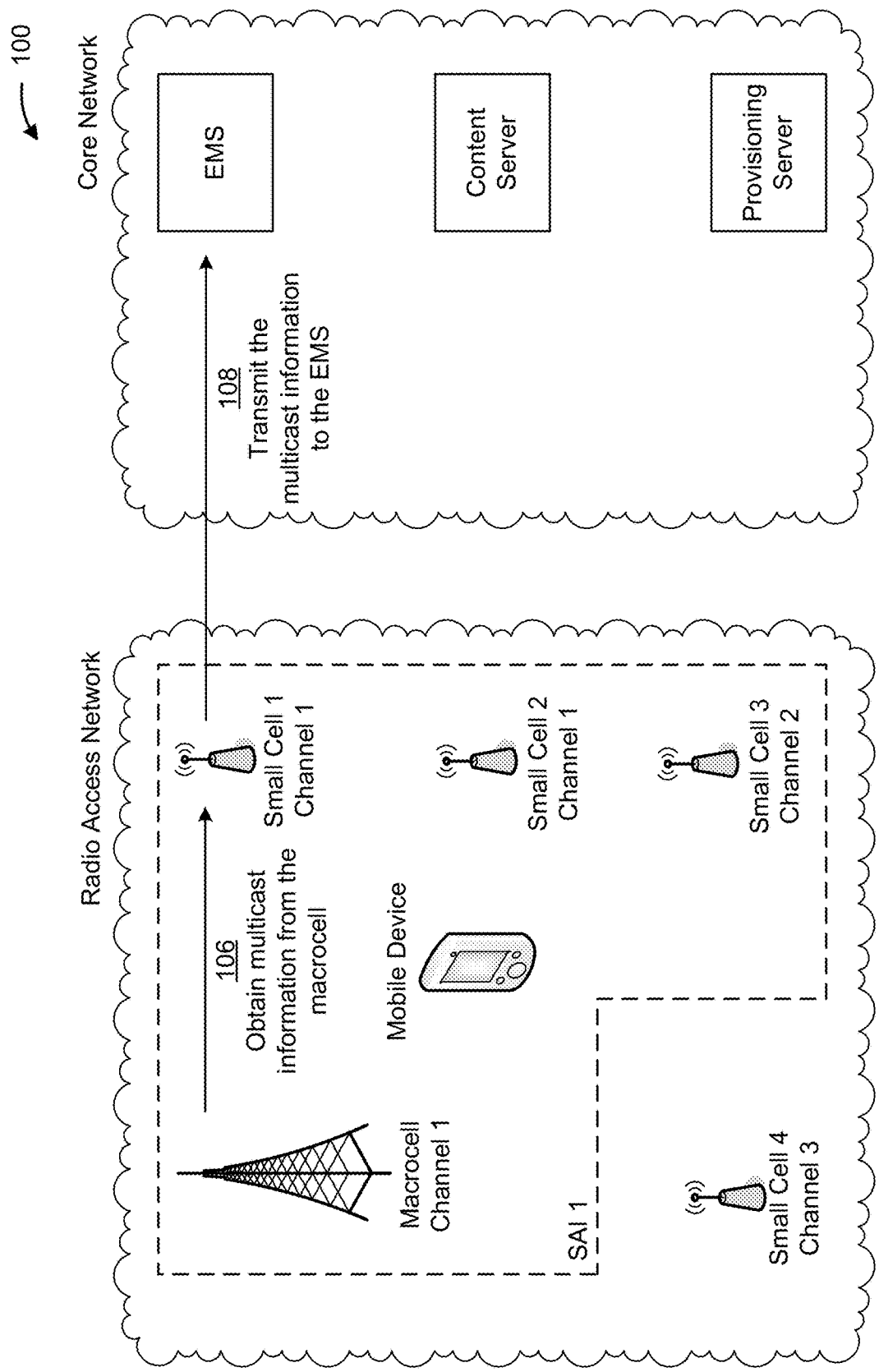

Turning to FIG. 1B, and as shown by reference number 106, one or more small cells included in the mobile network can obtain multicast information, associated with the macrocell, from the macrocell and/or from another base station (e.g., small cell 2 and/or the like) included in the mobile network. For example, small cell 1 can obtain the multicast information from the macrocell by performing a radio environment measurement (REM) scan (e.g., a scan whereby small cell 1 obtains various information and measurements from the macrocell) to obtain the multicast information associated with the macrocell. In some implementations, small cell 1 can perform the REM scan based on a schedule (e.g., a schedule that specifies small cell 1 is to perform the REM scan at particular times and/or particular time intervals), based on receiving an instruction to perform the REM scan (e.g., from the EMS, from a user, from another device or server included in the mobile network, etc.), and/or the like. In some implementations, small cell 1 can obtain the multicast information associated with the macrocell on an X2 or another type of interface between small cell 1 and the macrocell and/or between small cell 1 and another base station included in the mobile network that allows for the transmission of control signaling. In some implementations, small cell 1 can obtain the multicast information associated with the macrocell from the macrocell broadcasting the multicast information in the radio access network.

In some implementations, small cell 1 can receive the multicast information in a plurality of segments referred to as system information blocks (SIBs). Each SIB can include one or more portions of the multicast information associated with the macrocell. For example, a first SIB (e.g., SIB-2) can include information identifying one or more subframes that the macrocell (and the one or more other macrocells included in the MBSFN) is to use for multicast transmissions. In other words, SIB-2 can include information identifying the one or more subframes that the macrocell is to use for the multicast transmission session associated with the service announcement generated by the provisioning server (and stored on the content server). As another example, a second SIB (e.g., SIB-15) can include information identifying a frequency channel (e.g., Channel 1) associated with the macrocell, as well as information identifying a SAI (e.g., SAI 1) associated with the macrocell.

As shown by reference number 108, small cell 1 can transmit the multicast information associated with the macrocell to the EMS. In some implementations, small cell 1 can automatically transmit the multicast information to the EMS based on receiving the multicast information. In some implementations, small cell 1 can transmit the multicast information to the EMS at periodic intervals and/or at scheduled times. The EMS can receive the multicast information and store the multicast information at the EMS and/or another location.

Figure 1C:
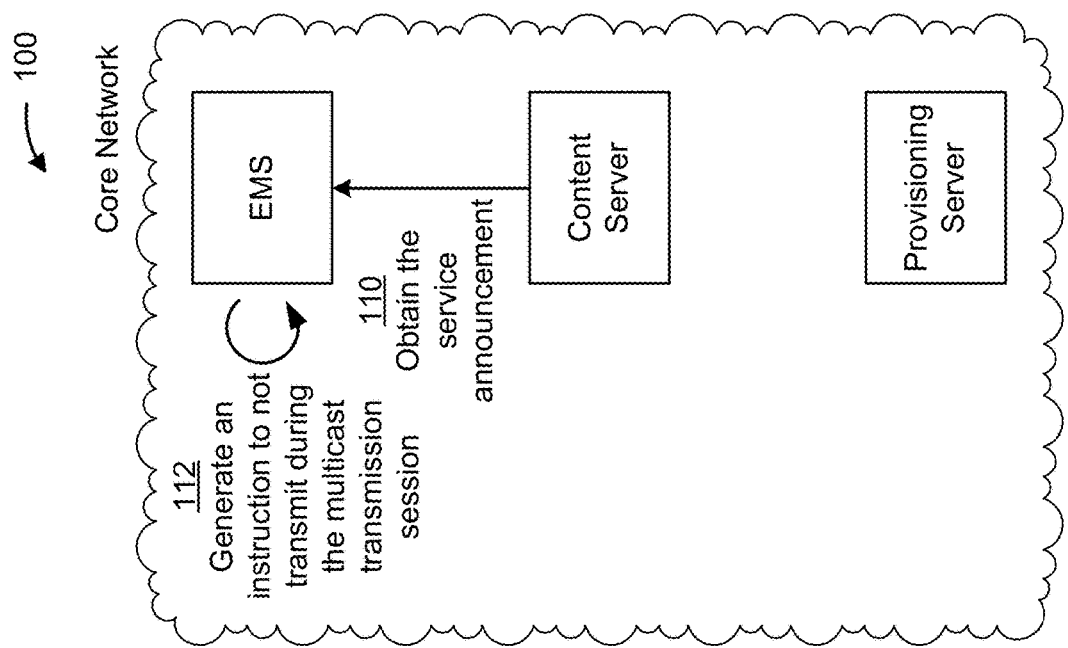
Figure 1C:
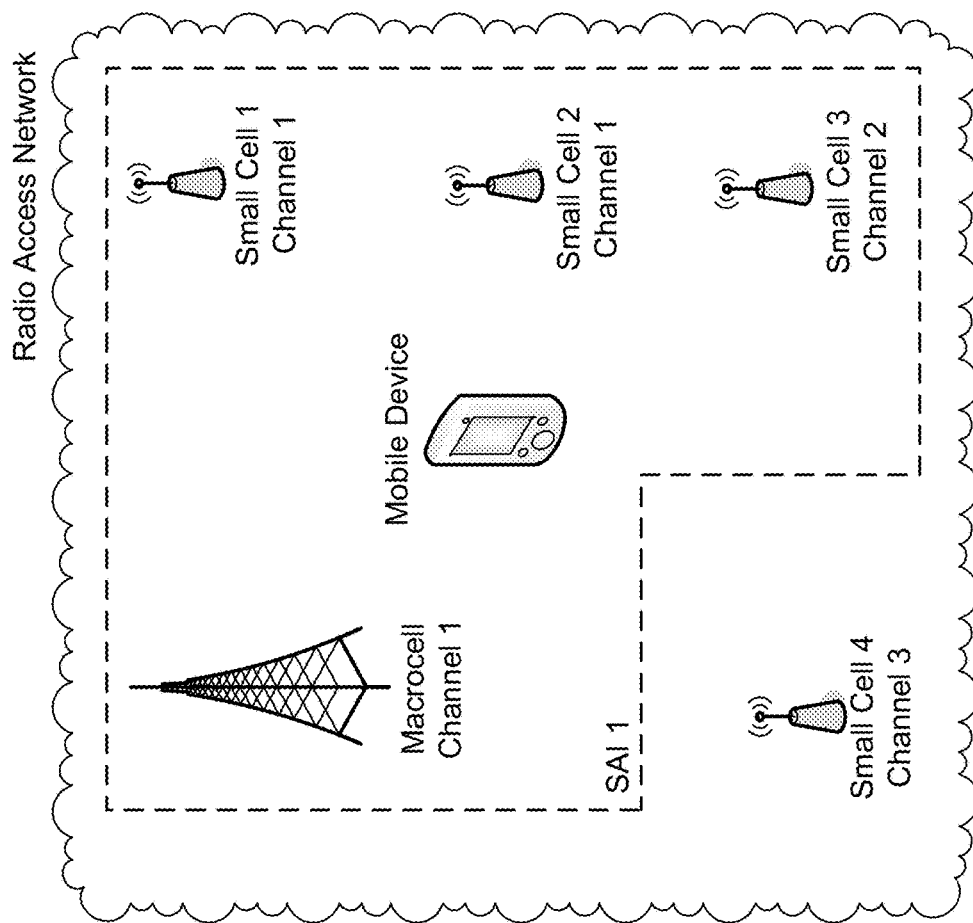

Turning to FIG. 1C, and as shown by reference number 110, the EMS can obtain the service announcement from the content server. In some implementations, the EMS can obtain the service announcement from the content server based on receiving the multicast information associated with the macrocell. For example, the EMS can identify the SAI and the frequency channel, associated with the macrocell, identified in the multicast information, and can identify the service announcement based on the service announcement including information identifying the same SAI and frequency channel. In some implementations, the EMS can obtain the service announcement prior to receiving the multicast information associated with the macrocell based on receiving an instruction (e.g., from a user) to obtain the service announcement from the content server, based on receiving a notification from the content server that the service announcement is available on the content server, and/or the like.

As shown by reference number 112, the EMS can reduce interference with the multicast transmission session by generating an instruction to one or more base stations included in the radio access network to not transmit during the multicast transmission session. To generate the instruction, the EMS can obtain the information, associated with the multicast transmission session, that is included in the service announcement associated with the multicast transmission session. For example, the EMS can parse the service announcement (e.g., using an XML parser, a JSON parser, etc.) to identify the schedule information, associated with the multicast transmission session, included in the service announcement. Accordingly, the EMS can generate the instruction to the one or more base stations included in the radio access network not to transmit during the multicast transmission session based on the schedule information, associated with the multicast session, included in the service announcement associated with the multicast transmission session. For example, the instruction can include information identifying the initiation time of the multicast transmission session, the time duration of the multicast transmission session, and/or the termination time of the multicast transmission session, and an instruction for the one or more base stations to not transmit after the initiation time, to not transmit between the initiation time and a termination time, to not transmit for the time duration, and/or the like.

In some implementations, the instruction can include an instruction for the one or more base stations to not transmit entirely during the multicast transmission session. In some implementations, the instruction can include an instruction for the one or more base stations to not transmit, during the multicast transmission session, using the one or more subframes identified in the multicast information associated with the macrocell. In this way, the one or more base stations can still transmit during the multicast transmission session in a way that does not interfere with the multicast transmission session, which increases the efficiency of the radio access network while reducing interference with multicast traffic in the radio access network.

Figure 1D:
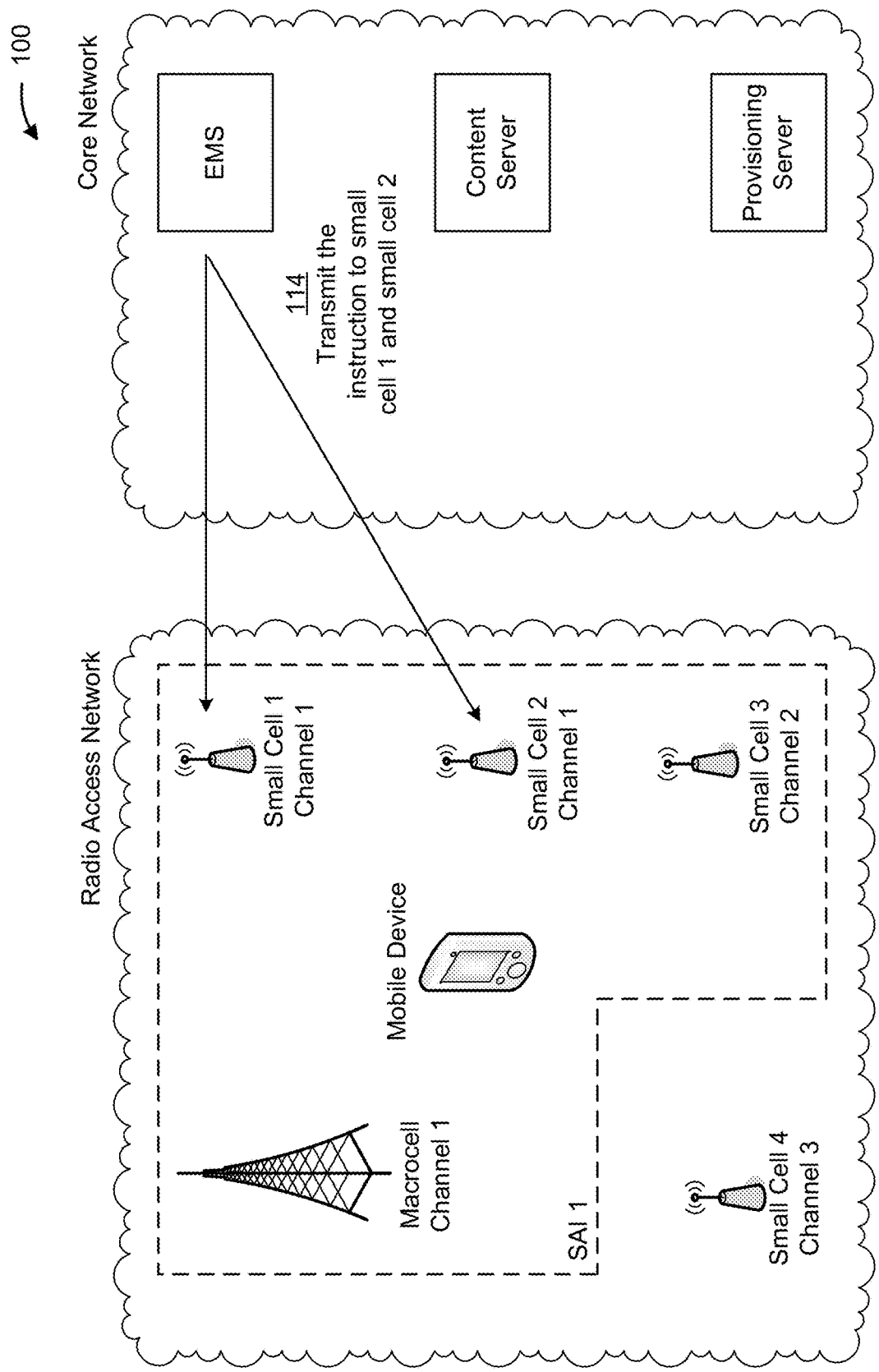

Turning to FIG. 1D, and as shown by reference number 114, the EMS can transmit the instruction to one or more base stations included in the radio access network. In some implementations, the EMS can transmit the instruction to all of the base stations included in the radio access network. To reduce the amount of network resources used to transmit the instruction, and to eliminate superfluous transmissions of the instruction, the EMS can transmit the instruction to base stations that are included the same SAI as the macrocell (e.g., SAI 1) and that use the same frequency channel as the macrocell (e.g., Channel 1). Accordingly, the EMS can transmit the instruction to small cell 1 and small cell 2 instead of all of the base stations included in the radio access network. In some implementations, the EMS can automatically transmit the instruction to small cell 1 and small cell 2 based on generating the instruction, at a particular time prior to initiation of the multicast transmission session, and/or the like. In some implementations, the EMS can transmit updated instructions to small cell 1, small cell 2, and/or the like. For example, the EMS can determine that the schedule for the multicast transmission session has changed (e.g., start time and/or end time has changed, etc.), and can transmit the updated instructions to reflect the changed multicast transmission session schedule. The EMS may transmit the updated instructions, prior to the multicast transmission session, during the multicast transmission session, and/or the like.

Figure 1E:
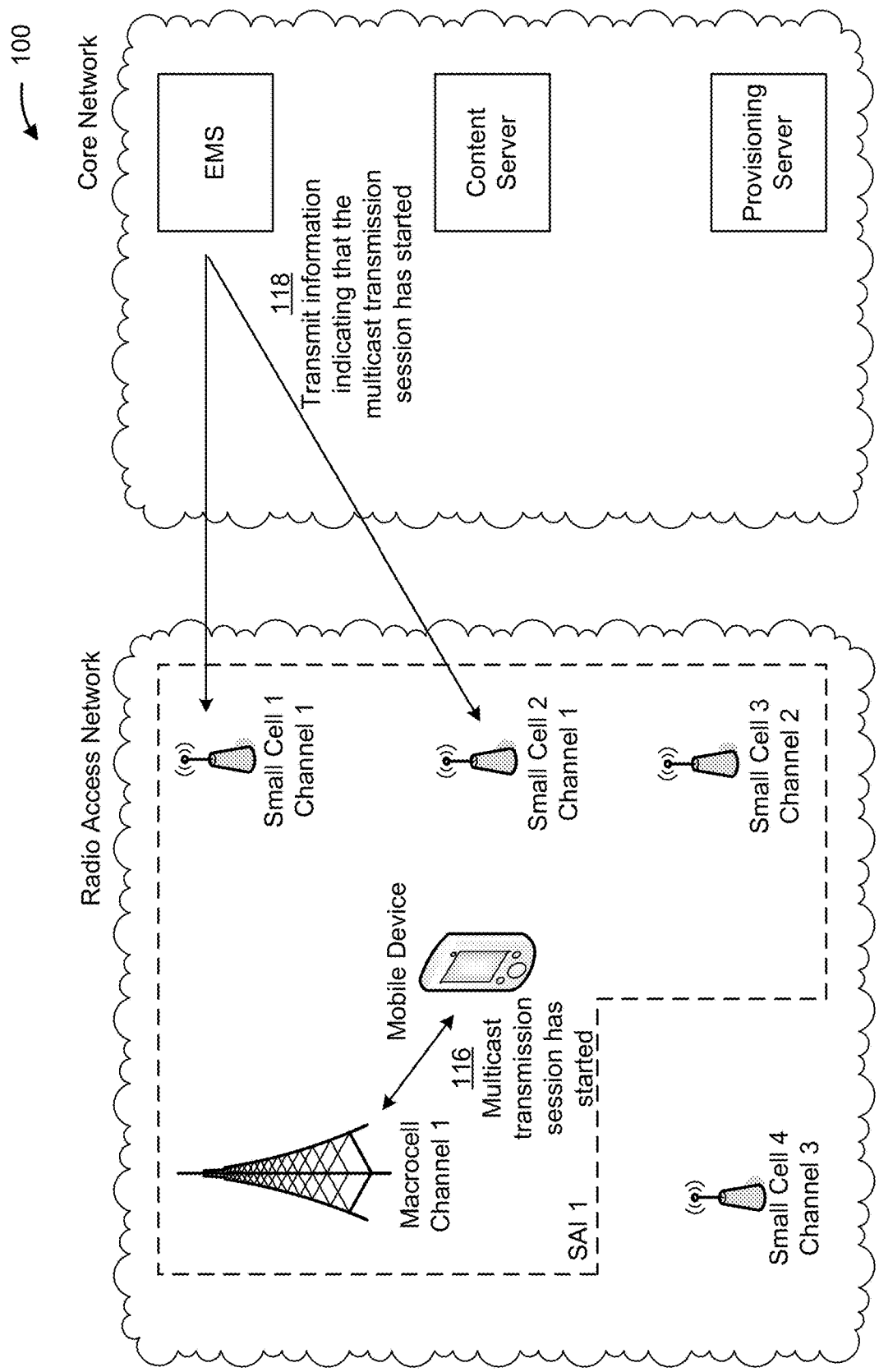

Turning to FIG. 1E, and as shown by reference number 116, the macrocell can initiate the multicast transmission session after the EMS provided the instruction to small cell 1 and small cell 2. In some implementations, the macrocell can initiate the multicast transmission session based on the information, associated with the multicast transmission session, included in the service announcement (e.g., as provided by the BMSC). For example, the macrocell can initiate the multicast transmission session based on the schedule information, associated with the multicast transmission session, included in the service announcement. In some implementations, the macrocell can initiate the multicast transmission session based on receiving the content, associated with the multicast transmission session, from the content server.

After initiating the multicast transmission session, the macrocell can transmit the content, identified in the service announcement, from the content server to the mobile device and/or other devices included in the mobile network. For example, the BMSC can obtain the content from the content server, transmit the content to the MBMS-GW communicatively connected to the macrocell, which can transmit the content to the macrocell so that the macrocell can transmit the content to the mobile device. As shown by reference number 118, the EMS may transmit, to small cell 1 and/or small cell 2, information indicating that the multicast transmission session has started.

Figure 1F:
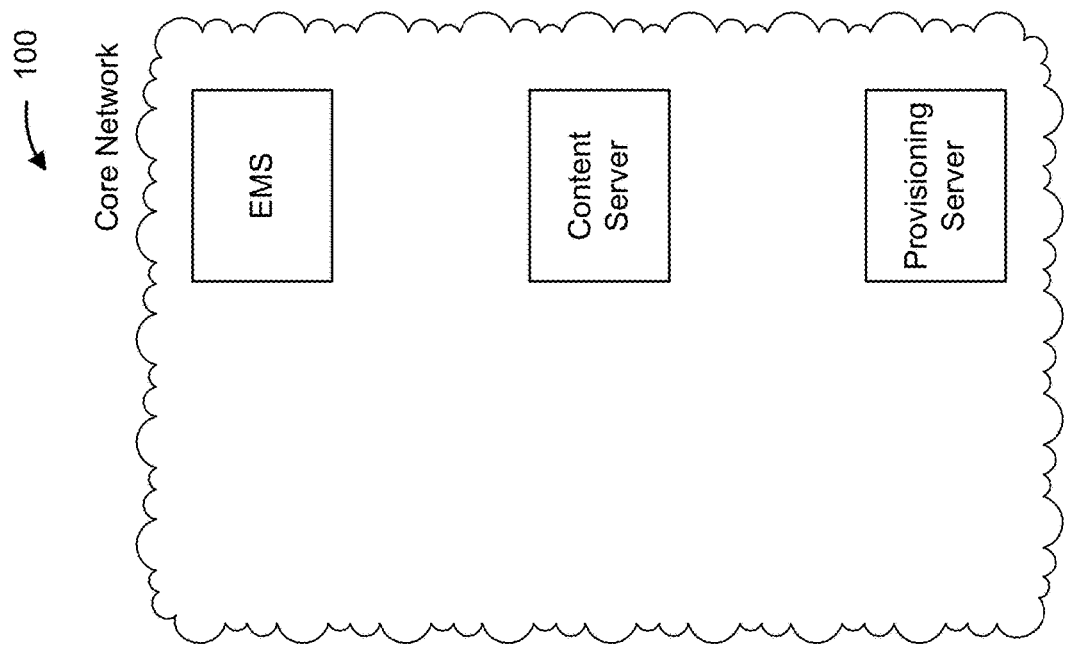
Figure 1F:
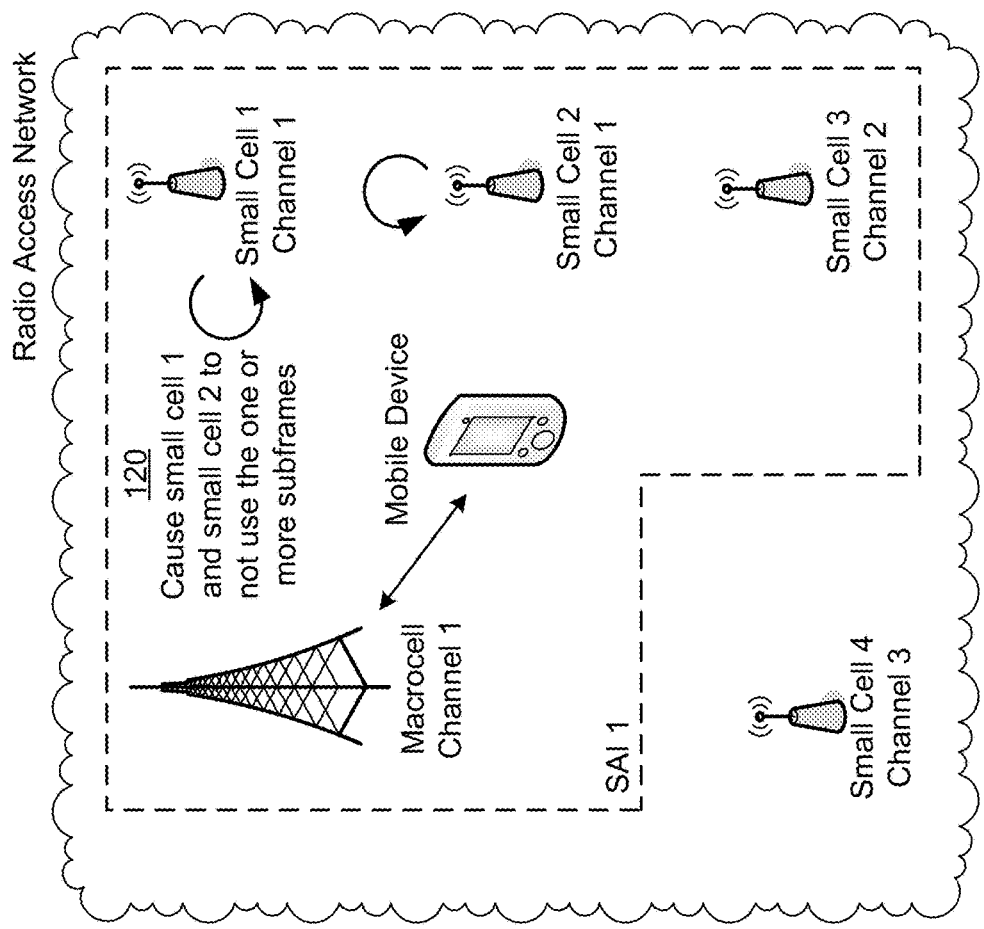

Turning to FIG. 1F, and as shown by reference number 120, small cell 1 can cause, based on the received instruction, small cell 1 to not transmit based on determining that the multicast transmission session has been initiated, and/or small cell 2 can cause, based on the received instruction, small cell 2 to not transmit based on determining that the multicast transmission session has been initiated. For example, small cell 1 and/or small cell 2 can determine that the multicast transmission session has been initiated. For example, small cell 1 and/or small cell 2 can determine that that multicast session has been initiated based on the multicast transmission schedule information included in the instruction received from the EMS (e.g., the initiation time identified in the information included in the instruction). In some implementations, small cell 1 can cause small cell 1 to not transmit entirely during the multicast transmission session, to not use the one or more subframes identified in the instruction to transmit during the multicast transmission session, and/or the like. Similarly, small cell 2 can cause small cell 2 to not transmit entirely during the multicast transmission session, to not use the one or more subframes identified in the instruction to transmit during the multicast transmission session, and/or the like. In this way, small cell 1 and small cell 2 do not interfere with the multicast transmission session, which increases the efficiency of the multicast transmissions in the mobile network, increases the throughput of multicast transmissions in the mobile network, increases the reliability of multicast transmissions in the mobile network, and reduces the amount of network resources used to retransmit dropped multicast traffic caused by interference with multicast transmission in the mobile network.

Figure 1G:
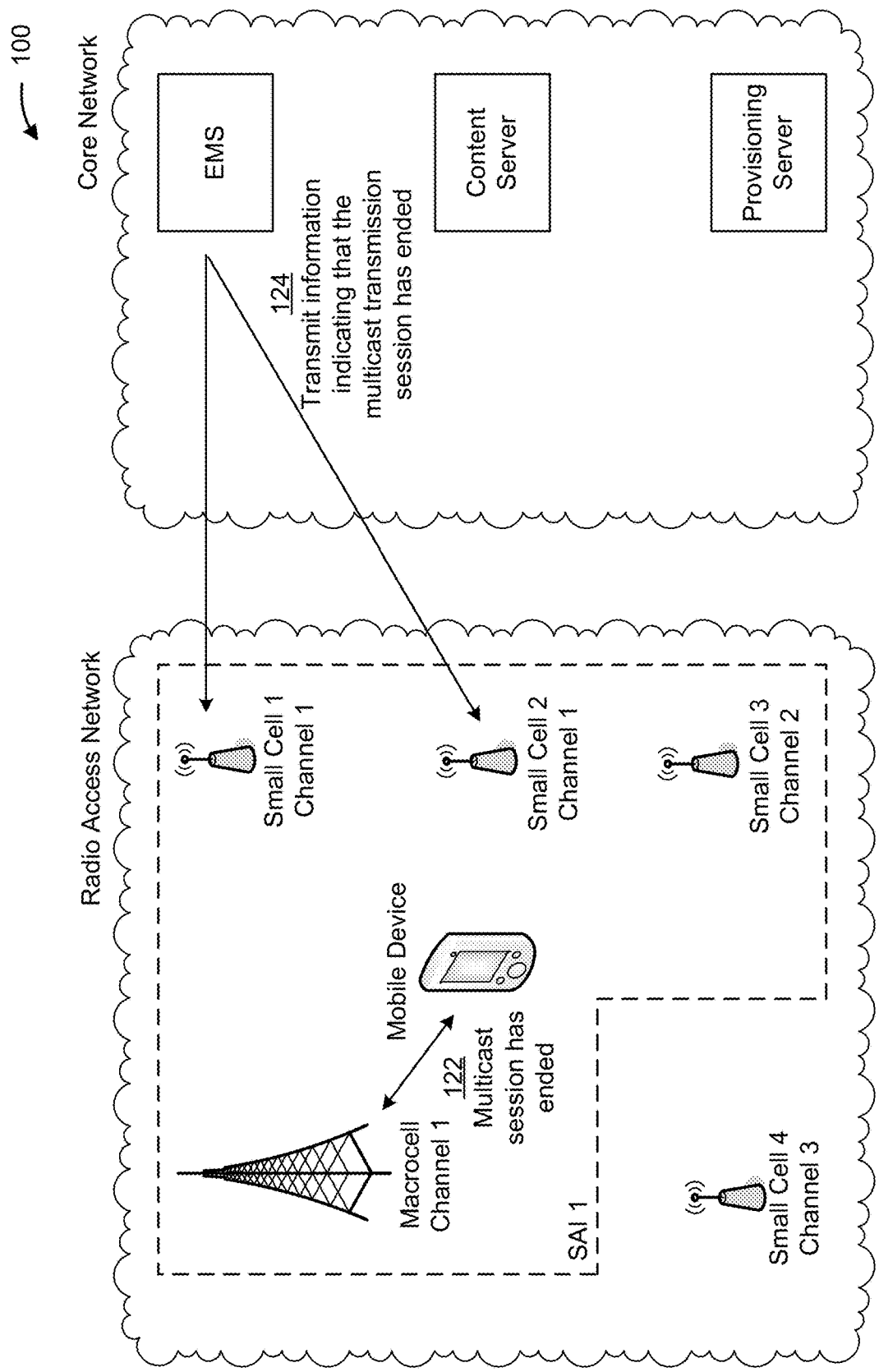

Turning to FIG. 1G, and as shown by reference number 122, the macrocell can terminate the multicast transmission session. For example, the macrocell can terminate the multicast transmission session based on the information, associated with the multicast transmission session, included in the service announcement. For example, the macrocell can terminate the multicast transmission session based on the schedule information, associated with the multicast transmission session, included in the service announcement. In some implementations, the macrocell can terminate the multicast transmission session based on determining that the amount of traffic being transmitted in the multicast session (e.g., the total amount of traffic, the amount of traffic transmitted in a particular time period, etc.) does not satisfy a threshold amount of traffic. As shown by reference number 124, the EMS can transmit, to small cell 1 and/or small cell 2, information indicating that the multicast transmission session has ended.

Figure 1H:
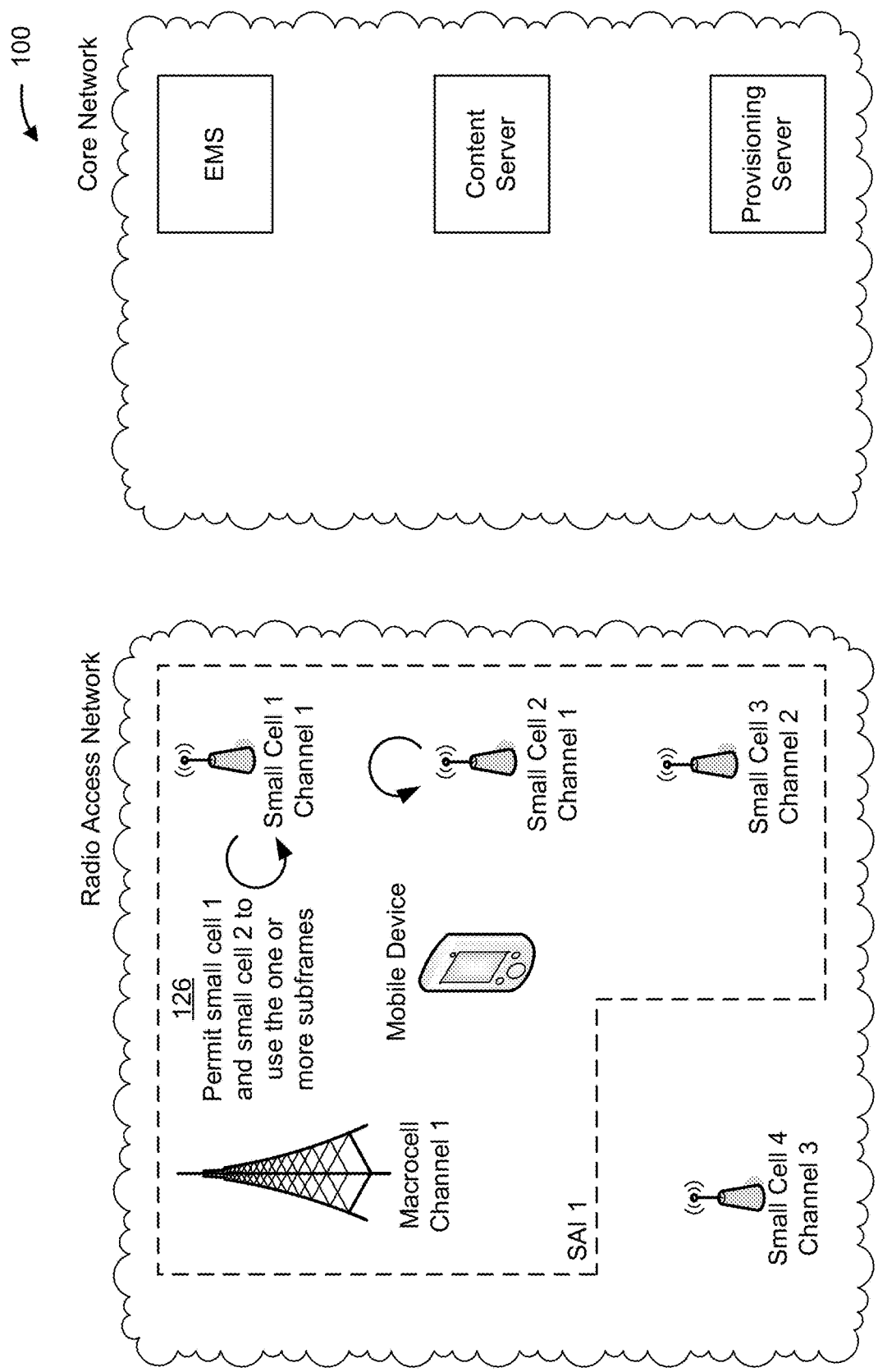

Turning now to FIG. 1H, and as shown by reference number 126, small cell 1 can permit small cell 1 to transmit using the one or more subframes associated with the multicast transmission session based on determining that the multicast transmission session has been terminated. Similarly, small cell 2 can permit small cell 2 to transmit using the one or more subframes associated with the multicast transmission session based on determining that the multicast transmission session has been terminated. For example, small cell 1 and/or small cell 2 can determine that the multicast transmission session has been terminated. For example, small cell 1 and/or small cell 2 can determine that that multicast session has been terminated based on the information included in the instruction received from the EMS (e.g., the termination time identified in the information included in the instruction, by determining that the time duration identified in the information included in the instruction has elapsed, etc.). In this way, small cell 1 and/or small cell 2 can use the one or more subframes associated with the multicast transmission session while the multicast transmission session is closed, which allows the one or more subframes to be more efficiently utilized, and can refrain from using the one or more subframes associated with the multicast transmission session while the multicast transmission session is established, which decreases interference with the multicast transmission session.

The number and arrangement of devices and networks shown in FIG. 1 are provided as an example. In practice, there can be additional devices and/or networks, fewer devices and/or networks, different devices and/or networks, or differently arranged devices and/or networks than those shown in FIG. 1. Furthermore, two or more devices shown in FIG. 1 can be implemented within a single device, or a single device shown in FIG. 1 can be implemented as multiple, distributed devices. Additionally, or alternatively, a set of devices (e.g., one or more devices) of environment 100 can perform one or more functions described as being performed by another set of devices of environment 100.

Figure 2:
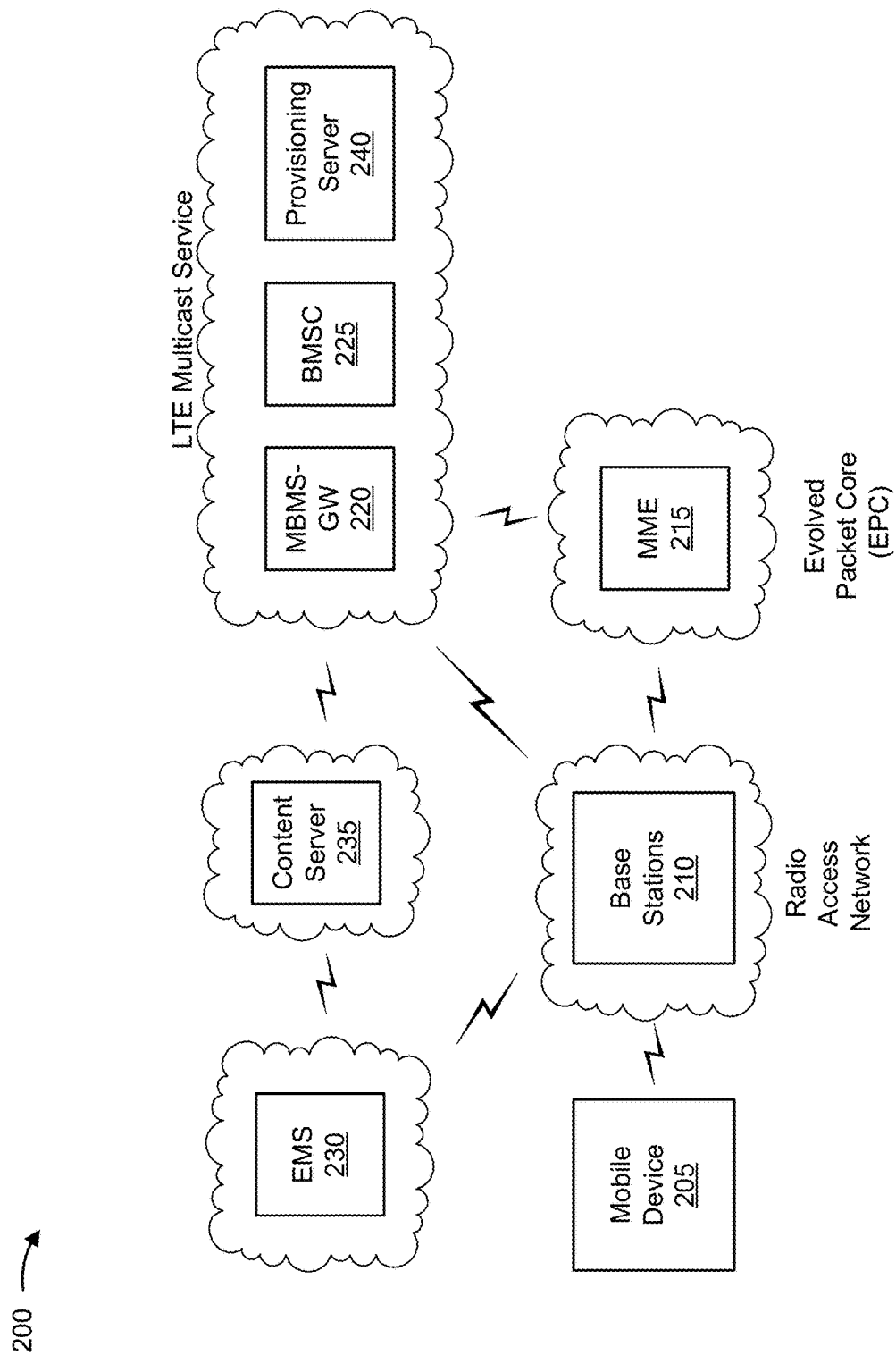
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a mobile device 205; a plurality of base stations 210 (collectively referred to as "base stations 210" and individually as "base station 210"; a mobility management entity device (MME) 215; a (multimedia broadcast multicast service (MBMS) gateway device (MBMS-GW) 220; a broadcast multicast service center device (BMSC) 225; an EMS device 230; a content server 235; and a provisioning server 240. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a 3G network, a 5G network, and/or the like.

Environment 200 can include a mobile network that includes a long term evolution (LTE) radio access network, a LTE multicast service, and/or an evolved packet core (EPC). The LTE radio access network (RAN) can include one or more base stations 210 via which mobile device 205 communicates with the EPC. The EPC can include MME 215. The LTE multicast service can include MBMS-GW 220, BMSC 225, and/or provisioning server 240.

Mobile device 205 includes one or more devices capable of communicating with base station 210 and/or a network (e.g., network 255). For example, mobile device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. Mobile device 205 can send traffic to and/or receive traffic from an external network (e.g., via base station 210, MBMS-GW 220, and/or the like).

Base station 210 includes one or more devices capable of transferring traffic, such as audio, video, text, and/or other traffic, destined for and/or received from mobile device 205. In some implementations, base station 210 can receive traffic from and/or sends traffic to the external network 255 via MBMS-GW 220 and/or the like. Additionally, or alternatively, one or more base stations 210 can be associated with a RAN that is not associated with the mobile network. Base station 210 can send traffic to and/or receive traffic from mobile device 205 via an air interface. In some implementations, base station 210 can include one or more small cell base stations, such as a base station of a microcell, a picocell, and/or a femtocell; one or more macrocell base stations, such as an eNodeB and/or a gNodeB; and/or the like.

In some implementations, a macrocell base station 210 can be associated with multicast transmission (e.g., a simultaneous transmission to a plurality of mobile devices). For example, the macrocell base station 210 can be included in a multicast-broadcast single-frequency network (MBSFN) along with one or more other macrocells. In some implementations, the macrocell base station 210 can provide multicast information to a small cell base station 210. In some implementations, the macrocell base station 210 can initiate a multicast transmission session and can transmit content from content server 235 to mobile device 205 (e.g., via MBMS-GW 220 and/or BMSC 225). In some implementations, the macrocell base station 210 can terminate a multicast transmission session.

In some implementations, a small cell base station 210 can be a femtocell, a picocell, a microcell, or the like. In some implementations, the small cell base station 210 can obtain multicast information, associated with a macrocell base station 210, from the macrocell base station 210 and/or from another base station 210. In some implementations, the small cell base station 210 can transmit multicast information to EMS device 230. In some implementations, the small cell base station 210 can obtain, from EMS device 230, an instruction to not transmit during a multicast transmission session, can determine that a multicast transmission session has been initiated, and can cause small cell base station 210 to not transmit during the multicast transmission session.

MME 215 includes one or more devices, such as one or more server devices, capable of managing authentication, activation, deactivation, and/or mobility functions associated with mobile device 205. In some implementations, MME 215 can perform operations relating to authentication of mobile device 205. Additionally, or alternatively, MME 215 can facilitate the selection of a particular MBMS-GW 220 to serve traffic to and/or from mobile device 205. MME 215 can perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 can select another MME (not pictured), to which mobile device 205 should be handed off (e.g., when mobile device 205 moves out of range of MME 215).

MBMS-GW 220 includes one or more devices capable of providing connectivity for mobile device 205 to external packet data networks (e.g., other than the depicted EPC and/or LTE network) and/or multimedia broadcast multicast services (MBMS). For example, MBMS-GW can include one or more data processing and/or traffic transfer devices, such as a gateway, a router, a modem, a switch, a firewall, a NIC, a hub, a bridge, a server device, an OADM, and/or the like. In some implementations, MBMS-GW 220 can receive traffic from network 255, and can send the traffic to mobile device 205 via base station 210. In some implementations, MBMS-GW 220 can record data usage information (e.g., byte usage).

In some implementations, MBMS-GW 220 can serve as the source of a broadcast/multicast flow between devices included in the LTE multicast service and base stations 210 involved in providing MBMS. In some implementations, MBMS-GW 220 can use source specific multicast (SSM) techniques to deliver data streams to multiple base stations 210 simultaneously. In some implementations, MBMS-GW 220 can include a point-to-multipoint interface that provides delivery of broadcast and multicast services (e.g., MBMS services, eMBMS services, etc.) via base station 210. In some implementations, MBMS-GW 220 can be a standalone network device and/or can be physically co-located with a serving gateway (SGW) device, a packet data network (PDN) gateway device (PGW), and/or BMSC 225.

BMSC 225 includes one or more devices capable of providing and managing multicast content to mobile device 205. For example, BMSC 225 can include a server, a data center, a workstation, and/or the like, that can receive multicast content from content server 235, and can broadcast and/or multicast the multicast content to mobile device 205 (e.g., via base station 210, MBMS-GW 220, etc.). In some implementations, BMSC 225 may include a SGmb interface for control plane with MBMS-GW 220; a SGi-mb interface for user plane with MBMS-GW 220; a web services-based provisioning interface with provisioning server 240; a notification interface with provisioning server 240; file ingestion interfaces; etc. In some implementations, BMSC 225 can manage authentication, authorization, and context of mobile device 205 for MBMS services, can transmit service announcements to mobile device 205 for MBMS services, and/or the like.

EMS device 230 includes one or more devices capable of managing small cell base stations 210, macrocell base station 210, or the like. EMS device 230 can store information associated with base stations 210, can receive information (e.g., provided by base stations 210, content server 235, provisioning server 240, etc.), can provide instructions to base stations 210, and/or the like. In some implementations, EMS device 230 can receive multicast information associated with the macrocell base station 210 from a small cell base station 210. In some implementations, EMS device 230 can receive a service announcement from content server 235. In some implementations, EMS device 230 can generate an instruction to not transmit during a multicast transmission session, can transmit the instruction to small cell base stations 210, and/or the like.

Content server 235 includes one or more devices capable of storing and delivering content (e.g., video files, audio files, software files, electronic documents, web pages, live video streams, live audio streams, etc.) for delivery to mobile device 205 (e.g., via base station 210, MBMS-GW 220, BSMC 225, and/or the like). In some implementations, content server 235 can include a content delivery network that includes a plurality of server devices, data centers, and/or the like. In some implementations, content server 235 can provide a service announcement to EMS device 230. Provisioning server 240 can include one or more devices capable of generating and transmitting a service announcement associated with a multicast transmission session. In some implementations, provision server 240 may be a BVPS. In some implementations, provisioning server 240 can generate a service announcement, can transmit the service announcement to content server 235, and/or the like.

The external network includes one or more wired and/or wireless networks. For example, the external network can include a telecommunications network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
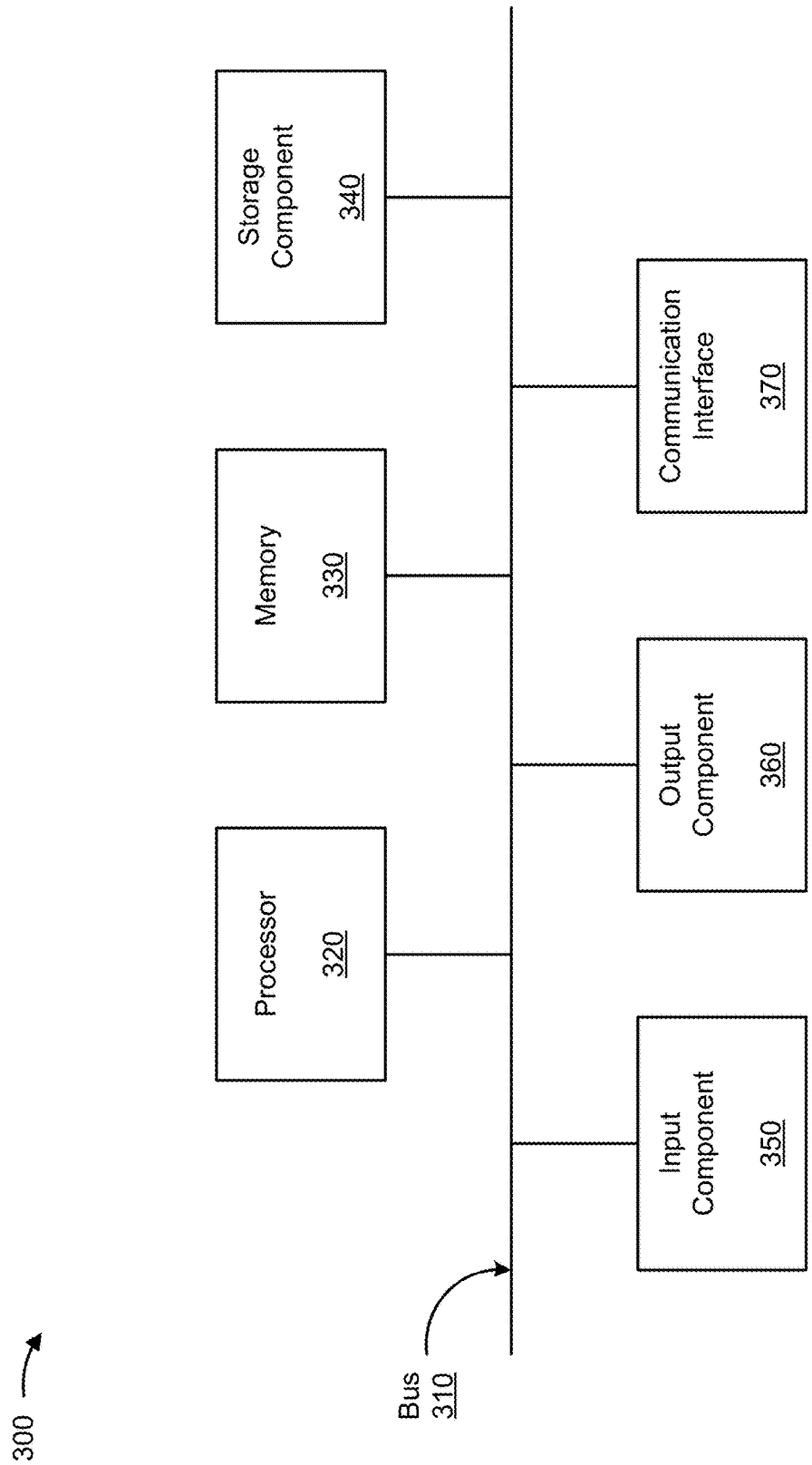
FIG. 3 is a diagram of example components of one or more devices of FIG. 2.

FIG. 3 is a diagram of example components of a device 300. Device 300 can correspond to mobile device 205; base station 210; MME 215; MBMS-GW 220; BMSC 225; EMS device 230; content server 235; and/or provisioning server 240. In some implementations, mobile device 205; base station 210; MME 215; MBMS-GW 220; BMSC 225; EMS device 230; content server 235; and/or provisioning server 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for multicast interference mitigation in a mobile network. In some implementations, one or more process blocks of FIG. 4 can be performed by a first cell device, such as a base station (e.g., base station 210). In some implementations, one or more process blocks of FIG. 4 can be performed by another device or a group of devices separate from or including the first cell device, such as one or more other cell devices (e.g., one or more other base stations 210), a mobile device (e.g., mobile device 205), a mobility management entity device (e.g., MME 215), a MBMS gateway device (e.g., MBMS-GW 220), a BMSC device (e.g., BMSC 225), an EMS device (e.g., EMS device 230), a content server (e.g., content server 235), a provisioning server (e.g., provisioning server 240), and/or the like.

As shown in FIG. 4, process 400 can include obtaining, from a second cell device, multicast information associated with the second cell device, wherein a first wireless coverage area associated with the first cell device at least partially overlaps a second wireless coverage area associated with the second cell device (block 410). For example, the first cell device (e.g., using processor 320, memory 330, storage component 340, input component 350, communication interface 370, and/or the like) can obtain, from a second cell device, multicast information associated with the second cell device, as described above in connection with FIGS. 1A-1H. In some implementations, a first wireless coverage area associated with the first cell device can at least partially overlap a second wireless coverage area associated with the second cell device.

As further shown in FIG. 4, process 400 can include transmitting the multicast information to an element management system (block 420). For example, the first cell device (e.g., using processor 320, memory 330, storage component 340, input component 350, communication interface 370, and/or the like) can transmit the multicast information to an element management system, as described above in connection with FIGS. 1A-1H.

As further shown in FIG. 4, process 400 can include receiving, from the element management system, an instruction to not use one or more subframes, associated with a multicast transmission session associated with the second cell device, to transmit during the multicast transmission session, wherein the instruction to not use the one or more subframes is generated based at least on the multicast information (block 430). For example, the first cell device (e.g., using processor 320, memory 330, storage component 340, input component 350, communication interface 370, and/or the like) can receive, from the element management system, an instruction to not use one or more subframes, associated with a multicast transmission session associated with the second cell device, to transmit during the multicast transmission session, as described above in connection with FIGS. 1A-1H. In some implementations, the instruction to not use the one or more subframes can be generated based at least on the multicast information.

As further shown in FIG. 4, process 400 can include determining, after receiving the instruction to not use the one or more subframes, whether the multicast transmission session associated with the second cell device has been initiated (block 440). For example, the first cell device (e.g., using processor 320, memory 330, storage component 340, input component 350, communication interface 370, and/or the like) can determine, after receiving the instruction to not use the one or more subframes, whether the multicast transmission session associated with the second cell device has been initiated, as described above in connection with FIGS. 1A-1H. If the first cell device determines that the multicast transmission session associated with the second cell device has not been initiated (block 440-NO), process 400 can return to block 440.

As further shown in FIG. 4, process 400 can include causing, based on determining that the multicast transmission session associated with the second cell device has been initiated (block 440-YES), the first cell device to not use the one or more subframes to transmit during the multicast transmission session associated with the second cell device (block 450). For example, the first cell device (e.g., using processor 320, memory 330, storage component 340, input component 350, communication interface 370, and/or the like) can cause, based on determining that the multicast transmission session associated with the second cell device has been initiated, the first cell device to not use the one or more subframes to transmit during the multicast transmission session associated with the second cell device, as described above in connection with FIGS. 1A-1H.

Process 400 can include additional implementations, such as any single implementation or any combination of implementations described below and/or described with regard to any other process described herein.

In some implementations, the multicast information associated with the second cell device can include a first system information block including information identifying the one or more subframes, a second system information block including information identifying a frequency associated with the multicast transmission session, and/or a third system information block including information identifying a service area identifier associated with the second cell device.

In some implementations, when obtaining the multicast information associated with the second cell device, the first cell device can perform, based on a schedule, a radio environment measurement scan to obtain the multicast information associated with the second cell device, can perform, based on receiving another instruction from the element management system, the radio environment measurement scan to obtain the multicast information associated with the second cell device, or can obtain the multicast information associated with the second cell device on an X2 interface between the first cell device and the second cell device.

In some implementations, the instruction to not use the one or more subframes can be generated further based on multicast schedule information, associated with the multicast transmission session, included in a service announcement file. In some implementations, the first cell device can be a small cell that can include a femtocell, a picocell, and/or a microcell, and the second cell device can be a macrocell. In some implementations, the first cell device can determine that the multicast transmission session has been terminated, and can permit, based on determining that the multicast transmission session has been terminated, the first cell device to transmit using the one or more subframes associated with the multicast transmission session.

In some implementations, the multicast transmission session can be associated with a frequency channel, and the first cell device, when causing the first cell device to not use the one or more subframes to transmit during the multicast transmission session associated with the second cell device, can cause the first cell device to not use the one or more subframes to transmit, on the frequency channel associated with the multicast transmission session, during the multicast transmission session.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations described herein provide a first cell device, such as a base station 210 capable of obtaining, from a second cell device, such as another base station 210, multicast information associated with the second cell device. A first wireless coverage area associated with the first cell device can at least partially overlap a second wireless coverage area associated with the second cell device. The first cell device can transmit the multicast information to an element management system, such as EMS device 230, and can receive, from the element management system, an instruction to not use one or more subframes, associated with a multicast transmission session associated with the second cell device, to transmit during the multicast transmission session. The instruction to not use the one or more subframes can be generated based at least on the multicast information. After receiving the instruction to not use the one or more subframes, the first cell device can determine that the multicast transmission session associated with the second cell device has been initiated, and can cause the first cell device to not use the one or more subframes to transmit during the multicast transmission session associated with the second cell device based on determining that the multicast transmission session associated with the second cell device has been initiated.

In this way, the first cell device can decrease interference with multicast transmission sessions in the network, which increases multicast performance in the network. Moreover, in this way, the first cell device conserves network resources that would otherwise be used to retransmit dropped multicast packets caused by interference with multicast transmission sessions in the network.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term traffic or content can include a set of packets. A packet can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first cell device, comprising:
one or more processors configured to:
obtain multicast information associated with a second cell device;
determine, based on the multicast information, to not use one or more first subframes, associated with a multicast transmission session associated with the second cell device, to transmit during the multicast transmission session; and
transmit during the multicast transmission session associated with the second cell device, without using the one or more first subframes, and using one or more second subframes, different from the one or more first subframes, wherein the first cell device and the second cell device transmit on the same channel.

2. The first cell device of claim 1, wherein the multicast information associated with the second cell device includes at least one of:
a first system information block including information identifying the one or more first subframes,
a second system information block including information identifying a frequency associated with the multicast transmission session, or
a third system information block including information identifying a service area identifier associated with the second cell device.

3. The first cell device of claim 1, wherein the one or more processors, when obtaining the multicast information associated with the second cell device, are to:
perform a radio environment measurement scan to obtain the multicast information associated with the second cell device, or
obtain the multicast information associated with the second cell device on an X2 interface between the first cell device and the second cell device.

4. The first cell device of claim 1, wherein determining to not use the one or more first subframes is further based on multicast schedule information, associated with the multicast transmission session, included in a service announcement file.

5. The first cell device of claim 1, wherein the first cell device is a small cell,
wherein the small cell includes at least one of:
a femtocell,
a picocell, or
a microcell, and
wherein the second cell device is a macrocell.

6. The first cell device of claim 1, wherein the one or more processors are further to:
determine that the multicast transmission session has been terminated; and
permit, based on determining that the multicast transmission session has been terminated, the first cell device to transmit using the one or more first subframes associated with the multicast transmission session.

7. The first cell device of claim 1, wherein a first wireless coverage area associated with the first cell device at least partially overlaps a second wireless coverage area associated with the second cell device.

8. A method, comprising:
obtaining, by a first cell device, multicast information associated with a second cell device;
determining, by the first cell device, to not use one or more first subframes, associated with a multicast transmission session associated with the second cell device, to transmit during the multicast transmission session; and
transmitting, by the first cell device, during the multicast transmission session associated with the second cell device, using one or more second subframes different from the one or more first subframes, and not using the one or more first subframes, wherein the first cell device and the second cell device transmit on the same channel.

9. The method of claim 8, wherein the multicast information associated with the second cell device includes at least one of:
a first system information block including information identifying the one or more first subframes,
a second system information block including information identifying a frequency channel associated with the multicast transmission session, or
a third system information block including information identifying a service area identifier associated with the second cell device.

10. The method of claim 8, wherein obtaining the multicast information associated with the second cell device comprises:
performing a radio environment measurement scan to obtain the multicast information associated with the second cell device, or
obtaining the multicast information associated with the second cell device on an X2 interface between the first cell device and the second cell device.

11. The method of claim 8, wherein determining to not use the one or more first subframes is further based on multicast schedule information, associated with the multicast transmission session, included in a service announcement file.

12. The method of claim 8, wherein the first cell device is a small cell,
wherein the small cell includes at least one of:
a femtocell,
a picocell, or
a microcell, and
wherein the second cell device is a macrocell.

13. The method of claim 8, further comprising:
determining that the multicast transmission session has been terminated; and
permitting, based on determining that the multicast transmission session has been terminated, the first cell device to transmit using the one or more first subframes associated with the multicast transmission session.

14. The method of claim 8, wherein a first wireless coverage area associated with the first cell device at least partially overlaps a second wireless coverage area associated with the second cell device.

15. A non-transitory computer-readable medium storing instructions, the instructions comprising:
one or more instructions that, when executed by one or more processors of a first cell device, cause the one or more processors to:

obtain multicast information associated with a second cell device, determine, based at least on the multicast information, to not use one or more first subframes, associated with a multicast transmission session associated with the second cell device, to transmit during the multicast transmission session; and cause, based on the multicast transmission session associated with the second cell device being initiated, the first cell device to not use the one or more first subframes to transmit during the multicast transmission session associated with the second cell device, and to use one or more second subframes, different from the one or more first subframes, to transmit during the multicast transmission session associated with the second cell device, wherein the first cell device and the second cell device transmit on the same channel.

16. The non-transitory computer-readable medium of claim 15, wherein the multicast information associated with the second cell device includes at least one of:
a first system information block including information identifying the one or more first subframes,
a second system information block including information identifying a frequency channel associated with the multicast transmission session, or
a third system information block including information identifying a service area identifier associated with the second cell device.

17. The non-transitory computer-readable medium of claim 15, wherein the one or more instructions, that cause the one or more processors to obtain the multicast information associated with the second cell device, cause the one or more processors to:
perform a radio environment measurement scan to obtain the multicast information associated with the second cell device, or
obtain the multicast information associated with the second cell device on an X2 interface between the first cell device and the second cell device.

18. The non-transitory computer-readable medium of claim 15, wherein the determination to not use the one or more first subframes is further based on multicast schedule information, associated with the multicast transmission session, included in a service announcement file.

19. The non-transitory computer-readable medium of claim 15, wherein the first cell device is a small cell,
wherein the small cell includes at least one of:
a femtocell,
a picocell, or
a microcell, and
wherein the second cell device is a macrocell.

20. The non-transitory computer-readable medium of claim 15, wherein the one or more instructions, when executed by the one or more processors, further cause the one or more processors to:
determine that the multicast transmission session has been terminated; and
permit, based on determining that the multicast transmission session has been terminated, the first cell device to transmit using the one or more first subframes associated with the multicast transmission session.

* * * * *